United States Patent

Nixon

[11] Patent Number: 5,260,084
[45] Date of Patent: Nov. 9, 1993

[54] MILK COMPOSITION AND METHOD OF MAKING

[76] Inventor: Floyd K. Nixon, 216 Ellis Dr., Paris, Tenn. 38242

[21] Appl. No.: 970,857

[22] Filed: Nov. 3, 1992

[51] Int. Cl.⁵ .............................................. A23C 9/154
[52] U.S. Cl. .................................... 426/580; 426/519; 426/521; 426/522; 426/573; 426/588
[58] Field of Search ............... 426/580, 588, 573, 519, 426/521, 522

[56] References Cited

U.S. PATENT DOCUMENTS

| | | | |
|---|---|---|---|
| 4,693,901 | 9/1987 | Hullah | 426/613 |
| 4,980,193 | 12/1990 | Tuason, Jr. et al. | 426/573 |
| 5,009,912 | 4/1991 | Nixon | 426/580 |
| 5,063,074 | 11/1991 | Kahn et al. | 426/580 |

*Primary Examiner*—Helen F. Pratt
*Attorney, Agent, or Firm*—Fred Philpitt

[57] ABSTRACT

A method and composition of improving of skim milk and low-fat milk so that it tastes like whole milk by mixing a colloidal grade of microcrystalline cellulose with skim or low-fat milk to make a thixotropic fluid.

2 Claims, No Drawings

MILK COMPOSITION AND METHOD OF MAKING

The use of animal fat in the human diet has been and is being discouraged. Avoiding milkfat has been given health importance for adults, children and infants. Milkfat is not only considered to be harmful to our health, but milkfat contains less nutrition (vitamins, minerals and protein) than milk without milkfat—which is SKIM MILK. Skim milk, which contains from 0 grams to 0.4% milkfat, is not as tasty as whole, lowfat or even ½% milkfat milk. After twenty or more years of discouraging milkfat consumption, skim milk has only risen from about 5% up to 10% of fluid milk sales in the U.S. in 1992. Lowfat (2%, 1%) has risen from about 15% in 1974 to about 50% of total fluid milk sales in 1992.

My invention modifies skim milk or lowfat milk so that they have the mouthfeel, taste and appearance of a milk with a much higher milkfat content. Fat molecules and globules are surrounded and rendered calorieless. The primary purpose, however, is to increase the appeal of skim milk, and lowfat milk.

My invention converts milk from a regular fluid to a thixotropic fluid which has a variable thickness. This quality of variable thickness is the key to its value. Skim milk has a viscosity of 7 to 9cps. The thixotropic fluid milk has a viscosity of 90 to 120cps—when undisturbed. Upon stirring, pouring or drinking, undetectable by the eye, the viscosity reduces to about 30 to 60cps—which matches the mouthfeel and the taste of 2% to 3% milkfat milk. It also gives a clean mouthfeel. Many attempts have been made to improve the taste of skim milk. Most attempts have been made by adding gums, stabilizers and many other thickeners to skim milk, which mostly results in a slick, uncharacteristic mouthfeel. My thixotropic fluid milk appears to be the solution to the improvement of taste and mouthfeel of skim milk.

To convert skim milk so that it becomes a thixotropic fluid, a three-dimensional network of cellulite particles, just less than 0.2 microns must be formed to impede the free flow of skim milk. The three-dimensional network of cellulite particles causes a permanent, variable viscosity increase which decreases when it is disturbed, stirred, poured or drank. It can instantly drop in viscosity, and just as quickly return to the higher viscosity. This phenomenon may make skim milk the most popular milk in the U.S. or world.

A colloidal grade of microcrystalline cellulose (MCC) must be used. To make a colloidal grade of MCC, the crystallites must be about 0.2 microns in size. Crystallites is the name given to the individual particles of MCC. These crystallites are coprocessed with sodium carboxymethyl cellulose (CMC), a soluble fiber. This process makes a colloidal grade of MCC. The proportion of MCC is 80-95% to 5% to 20% CMC.

FMC of Philadelphia produces colloidal grades of MCC—and at this time is the only producer. FMC produces a variety of colloidal MCC which vary in granule size and proportion of CMC to MCC.

The concentration of cellulite particles is critical to maintaining a thixotropic fluid. The minimum concentration of colloidal MCC to form a tri-dimensional network of cellulite particles and creating a thixotropic fluid is about 0.02 to 0.04% by weight of the fluid milk. Below this concentration the cellulite particles cannot support each other in the tri-dimensional network. When less than the minimum concentration of colloidal MCC is used a temporary thixotropic fluid may be formed, but the crystallites fall out and the thixotropic fluid if formed then reverts to regular fluid milk. The maximum concentration to maintain a thixotropic fluid ranges from 0.30 to 0.45% by weight of the milk depending on the temperature, concentration of milk solids and amount of milkfat. After exceeding this maximum concentration, the thixotropic fluid changes to a thixotropic gel. A thixotropic gel, when stirred or disturbed, changes instantly from a gel to a fluid, but when undisturbed, almost instantly unseen by the eye, changes back to a gel.

My invention can be illustrated by the following examples.

EXAMPLE 1

I pumped 10 gallons, or 1280 ounces of skim milk which had just less than one gram of milkfat per 8 oz. into a 20 gallon container which had an agitator. I then added 0.06% MCC by weight of the milk to the vortex of the agitating milk. This was 0.768 oz (21.77 grams) of a spray dried colloidal grade of MCC (88% MCC - 12% CMC). I then pumped the slurry through a pasteurizer, and immediately from the pasteurizer the slurry flowed into a homogenizer. The pressure of the homogenizer was 1500 PSI. The slurry converted almost immediately upon approaching 1500 pounds per square inch to a thixotropic fluid milk. I performed standardized tests on samples for viscosity and fat content, which are the two measurable variables. The fat content test showed "0". The viscometer testing yielded 92 cps.

EXAMPLE 2

I pumped 10 gallons of whole milk into the 20 gallon container. This milk was tested previous to use and it had 3.57% milkfat. I added 0.3% or 3.84 ounces of RC-MCC (88% MCC - 12% CMC) to the vortex of the agitating milk. I then pumped the slurry of whole milk and colloidal MCC to a pasteurizer and then to a homogenizer. The test for viscosity showed 120 cps. The percent of milkfat reduced to 3.48 which is an 0.18 point drop or a milkfat reduction of just beyond 5%. At 3.57% milkfat, the 10 gallons of whole milk weighed 1280 oz. and 3.57% of the 1280 oz. was 47 oz. When this reduced to 3.48 the new milkfat content reduced to 44.5 ounces a 2½ oz. reduction of milkfat content. Milkfat generally is tested to have 9 calories per gram. There are 28.35 grams per ounce. There was, then, 71 grams of fat globules and molecules which were rendered calorieless, or just beyond a 5% fat content and calorie reduction or 639 calories that were reduced.

EXAMPLE 3

I obtained 10 gallons of skim milk containing 0.5% milkfat by weight which is 1.134 grams per 8 oz serving. I then added 0.2% RC-MCC in proportion to the total weight of the milk or 1280 oz.×0.002=2.56 ounces. This milk was pumped into a 20 gallon container with an agitator with good shear and high speed. I turned the mixer on high speed and beat the slurry 5 minutes. I then tested the resultant thixotropic fluid milk. The fat content tested "0". The viscosity tested 112 cps. There were 160 8 oz. servings in the 10 gallons and at a milkfat reduction of 1.134 grams per 8 oz. serving there were 181.44 gms milkfat which were rendered calorieless, or a reduction of 1632.96 calories in 10 gallons of skim milk. This amounts to 10.21 calories reduced in each 8 oz. serving.

I pumped the Example 3 batch of thixotropic fluid milk to a nearby standard operating spray dryer and spray dried the 10 gallon, batch, which tested 0 fat content with a viscosity of 112 cps. When the spray drying was complete the resulting milk solids weighed 136 ounces, which is 10.625% or 0.625% better than the typical yield of 128 ounces from 1280 ounces of milk or 10%. I then reconstituted the 136 ounces of milk solids by adding sufficient water to re-make 1280 ounces of 10 gallons of milk. I then tested by standardized tests the reconstituted batch. I again found 0 milkfat, but the viscosity improved 5.4% to 118 cps.

I pumped the batch of whole milk from Example 2 through the spray dryer, which was set at normal temperature and speed settings. The dried whole milk solids yield proved to be about 0.75% better than typical yield. The test for fat content showed 3.40%, a further small reduction from the thixotropic fluid whole milk test which reduced from 3.57% to 3.48%. Then after spray drying and reconstitution reduced an additional 0.08%. The viscosity increased to 125 cps from 120 cps showing a 4% gain of viscosity.

I pumped 10 gallons of skim milk into a 20 gallon container and while agitating I added 1% colloidal MCC or 1280 ounces×0.01 or 12.8 ounces to the batch. I then homogenized the batch, then immediately pumped this batch to the spray dryer. The dry yield was 146.8 ounces of which 12.8 ounces may be accounted for by the MCC, but 6 ounces better yield is a definite increase over normal yield. I then reconstituted the total batch. A thixotropic gel resulted. I stirred the gel and it became a liquid instantly. I found I could pump and process this gel as readily as any liquid. I then pumped this 10 gallon batch to a 100 gallon tank with an agitator. I added 90 additional gallons of water and then sampled. I found 0 fat content, and I found the viscosity of the diluted thixotropic fluid skim milk to be 94 cps. I then tasted this sample and I found the taste to be almost the same as fresh 2½% milkfat milk.

My thixotropic fluid or spray dried milk may contain a number of additives such as cream flavor, and other flavors, beta carotene and other colors, vitamins, minerals, gum arabic, and other soluble fibers, acidifying agents to aid or permit digestibility and any number of other additives so long as these do not interfere with the thixotropic and taste qualities that are achieved by adding 0.02% to 1%, 2% or more colloidal MCC.

In summary then my invention includes 1. a method for improving the mouthfeel and taste of skim milk and low fat milk so that it will approach the taste of 2% to 3% milkfat milk.
2. a reduction of the digestibility of milkfat content and consequently the calorie content from 4 to 6% of higher milkfat content milk to 100% of lowfat content milk.
3. a method for improving the mouthfeel and taste of lowfat and higher milkfat content milk.
4. a method for converting skim, lowfat, whole milk and higher milkfat content to a thixotropic fluid which can be spray dried and then returned to the original viscosity plus some increase in viscosity upon reconstitution.
5. a method for converting fluid milk to a thixotropic gel so as to more economically process and transport the milk.

My preferred milk composition includes 0.02%-1%, 2% or more by weight (based on the weight of the milk) of a colloidal grade of microcrystalline cellulose, which means it has been coprocessed with a mixture of a. 80-90% by weight of microcrystalline cellulose (MCC) and
b. 10-20% by weight of sodium carboxymethyl cellulose (CMC).

Stated in another way, my invention involves a milk composition using a specific formula which improves skim milk to taste like 2%-3% milkfat milk and enhances higher milkfat milk content with the same formula, method and idea which consists essentially of a slurry of skim milk, lowfat milk or higher milkfat content milk converted to a thixotropic fluid or gel by high pressure such as homogenization and/or intense sheared beating. This results in 1. improving skim milk by converting to a thixotropic fluid or gel.
2. reduction of fat content by converting to a thixotropic fluid or gel with colloidal MCC.
3. improving the taste and mouthfeel of lowfat and higher milkfat milk with a thixotropic fluid or gel with colloidal MCC.

What I claim is:

1. A method for improving skim milk and low-fat milk so that they approach the taste and mouth-feel of whole milk which consists essentially of forming a slurry by mixing skim milk and/or low-fat milk with 0.02-2.0% or more by weight, based on the weight of the milk, of a colloidal grade of microcrystalline cellulose consisting of a mixture of (a) 80-95% by weight of microcrystalline cellulose, and (b) 5-20% by weight of sodium carboxymethyl cellulose, pumping the slurry through a pasteurizer and then homogenizing the pasteurized slurry resulting in a conversion of the milk to a thixotropic fluid or a thixotropic gel.

2. A milk composition that approaches the taste and mouthfeel of whole milk which consists essentially of a mixture of skim milk and low fat milk with 0.2-2.0% or more by weight, based on the weight of the milk, of a colloidal grade of microcrystalline cellulose consisting of a mixture of (a) 80-95% by weight of microcrystalline cellulose, and (b) 5-20% by weight of sodium carboxymethyl cellulose.

* * * * *